US 12,447,942 B2

(12) United States Patent
Thierer et al.

(10) Patent No.: US 12,447,942 B2
(45) Date of Patent: Oct. 21, 2025

(54) METHOD FOR TESTING THE FUNCTIONAL CAPABILITY OF A HYDRAULIC VEHICLE BRAKING SYSTEM

(71) Applicant: Robert Bosch GmbH, Stuttgart (DE)

(72) Inventors: Carsten Thierer, Abstatt (DE); Rolf-Hermann Mergenthaler, Leonberg (DE); Otmar Bussmann, Abstatt (DE); Peter Ziegler, Grossbottwar (DE); Tim-Philipp Jesse, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 797 days.

(21) Appl. No.: 17/259,160

(22) PCT Filed: May 25, 2019

(86) PCT No.: PCT/EP2019/063555
§ 371 (c)(1),
(2) Date: Jan. 9, 2021

(87) PCT Pub. No.: WO2020/025188
PCT Pub. Date: Feb. 6, 2020

(65) Prior Publication Data
US 2021/0316709 A1    Oct. 14, 2021

(30) Foreign Application Priority Data
Aug. 1, 2018   (DE) .......................... 102018212850.2

(51) Int. Cl.
*B60T 17/22* (2006.01)
*B60T 8/40* (2006.01)
(Continued)

(52) U.S. Cl.
CPC .......... *B60T 17/221* (2013.01); *B60T 8/4081* (2013.01); *B60T 13/142* (2013.01); *B60T 13/148* (2013.01);
(Continued)

(58) Field of Classification Search
CPC ...... B60T 17/22; B60T 17/221; B60T 13/142; B60T 13/148; B60T 13/686; B60T 8/4081; B60T 2270/404; B60T 2270/406
See application file for complete search history.

(56) References Cited

U.S. PATENT DOCUMENTS 5,779,327 A * 7/1998 Nakashima ............... H04B 7/26
303/122.1
5,934,880 A * 8/1999 Yamada ................ B60T 8/4045
303/10
(Continued)

FOREIGN PATENT DOCUMENTS

| CN | 102481915 A | 5/2012 |
| CN | 106467101 A | 3/2017 |

(Continued)

OTHER PUBLICATIONS

International Search Report for PCT/EP2019/063555, Issued Aug. 19, 2019.

*Primary Examiner* — Thomas J Williams
(74) *Attorney, Agent, or Firm* — NORTON ROSE FULBRIGHT US LLP

(57) ABSTRACT

For testing the functional capability of a hydraulic power vehicle braking system, a power brake pressure generator is switched on. The power brake pressure generator displaces brake fluid through the non-actuated master brake cylinder into a brake fluid reservoir, which is why no brake pressure is built up. A brake pressure build-up allows a "hidden (Continued)

defect" to be inferred, which has no impact during normal operation and is therefore not noticed.

25 Claims, 1 Drawing Sheet

(51) Int. Cl.
 *B60T 13/14* (2006.01)
 *B60T 13/68* (2006.01)
(52) U.S. Cl.
 CPC ....... *B60T 13/686* (2013.01); *B60T 2270/406* (2013.01)

(56) References Cited

U.S. PATENT DOCUMENTS

| | | | | |
|---|---|---|---|---|
| 6,132,010 A * | 10/2000 | Holt | ...................... | B60T 17/02 |
| | | | | 303/122.12 |
| 6,206,489 B1 * | 3/2001 | Schmidt | ............... | B60T 17/221 |
| | | | | 303/122.08 |
| 6,450,591 B1 * | 9/2002 | Kawahata | ............. | B60T 8/3655 |
| | | | | 303/122.05 |
| 9,616,874 B2 * | 4/2017 | Maucher | ................ | B60T 17/221 |
| 2017/0106843 A1 * | 4/2017 | Jeong | .................... | B60T 13/745 |
| 2017/0158184 A1 * | 6/2017 | Choi | ..................... | B60T 17/221 |
| 2018/0111593 A1 * | 4/2018 | Kim | ........................ | B60T 7/042 |
| 2018/0118183 A1 * | 5/2018 | Spieker | ................. | B60T 17/221 |
| 2018/0162338 A1 | 6/2018 | Irwan et al. | | |
| 2018/0162340 A1 * | 6/2018 | Irwan | ........................ | B60T 8/90 |
| 2021/0316709 A1 * | 10/2021 | Thierer | ................... | B60T 7/042 |

FOREIGN PATENT DOCUMENTS

| | | |
|---|---|---|
| CN | 107921947 A | 4/2018 |
| DE | 102009045714 A1 | 11/2010 |
| DE | 102016224057 A1 | 6/2017 |
| EP | 3333029 A1 | 6/2018 |
| WO | 2012150120 A1 | 11/2012 |
| WO | 2012167979 A1 | 12/2012 |

* cited by examiner

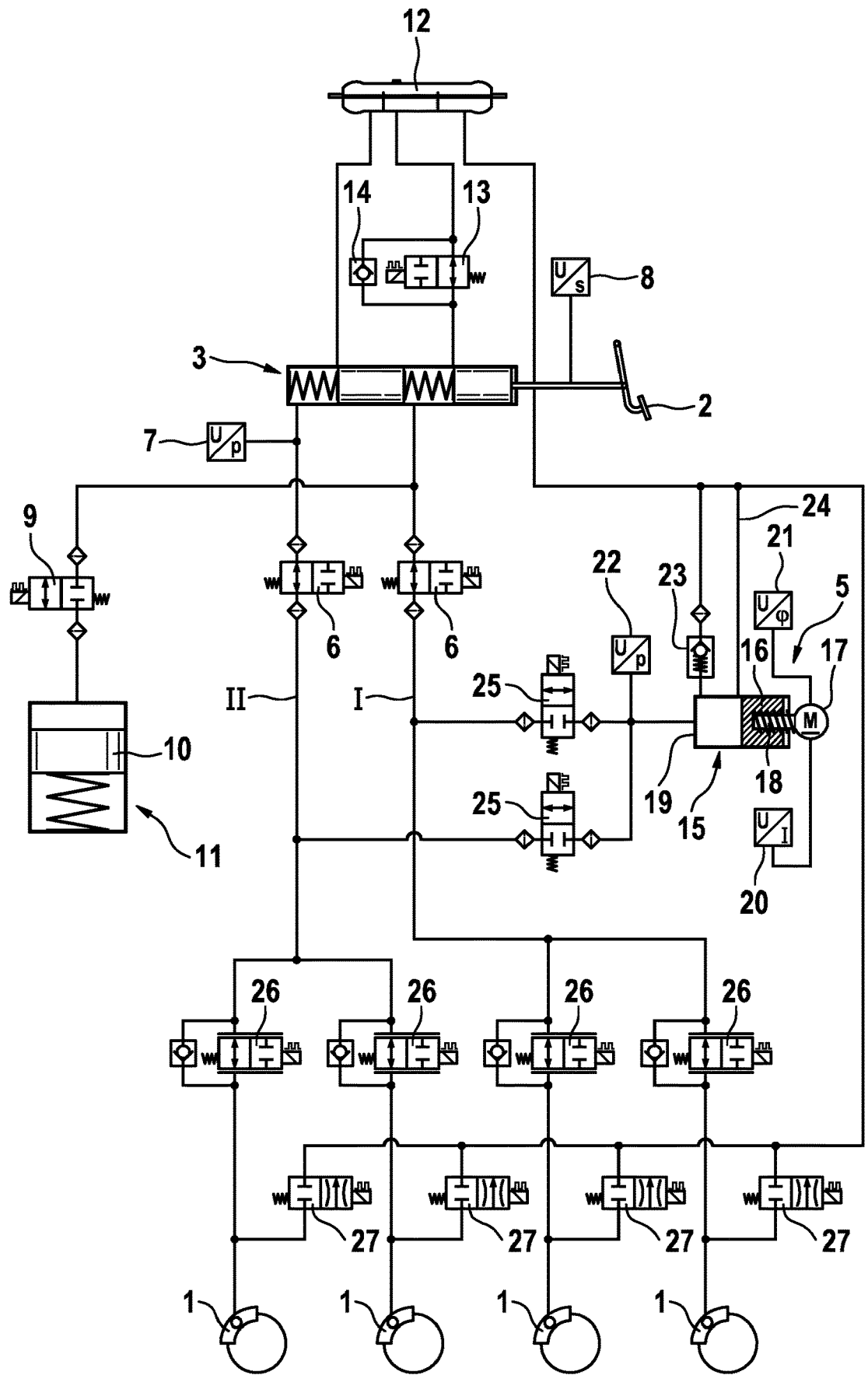

METHOD FOR TESTING THE FUNCTIONAL CAPABILITY OF A HYDRAULIC VEHICLE BRAKING SYSTEM

The present invention relates to a method for testing the functional capability of a hydraulic vehicle braking system, which includes a master brake cylinder and a power brake pressure generator.

The master brake cylinder is, in particular, a master brake cylinder actuatable by muscle power or auxiliary power, the latter meaning an actuation of the master brake cylinder by muscle power, boosted by typically a low pressure brake booster or, for example, also an electromechanical brake booster.

The power brake pressure generator is used for a brake pressure build-up for a power brake application and/or a brake pressure build-up and/or a delivery of brake fluid during a slip regulation. Such slip regulations are, for example, an anti-lock protection, a traction control system and/or a vehicle dynamics control system or an electronic stability program, the latter colloquially also being referred to as an anti-slip control system. The abbreviations ABS, TCS, and VDC or ESP are common for these slip regulations. Slip regulations may take place during a muscle or auxiliary power braking, during a power brake application, or also without brake application. During a power brake application, the master brake cylinder is used as a setpoint generator for a brake pressure to be generated using external power.

The power brake pressure generator includes, in particular, a piston-cylinder unit, whose piston is displaceable in the cylinder for a pressure build-up and/or for delivering brake fluid with the aid of external power, for example an electric motor, via a threaded drive. For example, a hydraulic pump is also usable as a power brake pressure generator, for example a piston pump or an (internal) gear pump, it also being possible to interpret a piston-cylinder unit as a piston pump.

The method according to the present invention is usable for single-, dual- or multi-circuit vehicle braking systems and includes modifications for dual- and multi-circuit vehicle braking systems.

The present invention is, in particular, provided for detecting so-called "hidden defects" which do not have any impact during normal braking and, for this reason, are normally not noticed, but which, when another malfunction occurs, may, in some circumstances, severely impact the braking behavior.

BACKGROUND INFORMATION

PCT Application No. WO 2012/150 120 A1 describes a hydraulic power vehicle braking system including two brake circuits, each including two hydraulic wheel brakes, the two brake circuits being connected to a power brake pressure generator and to a muscle power-actuatable dual-circuit master brake cylinder. The two brake circuits are hydraulically connected to the master brake cylinder in parallel to the power brake pressure generator, so that the vehicle braking system may be selectively actuated by the master brake cylinder, the power brake pressure generator or both. The power brake pressure generator of the vehicle braking system includes a piston-cylinder unit, whose piston is displaceable in the cylinder with the aid of an electric motor via a rotation/translation converter gear, for example a threaded drive.

SUMMARY

A method according to an example embodiment of the present invention is provided for testing the functional capability and, in particular, for detecting a so-called "hidden defect" of a hydraulic vehicle braking system, which is normally not noticed during braking.

According to the an example embodiment of the present invention, the power brake pressure generator is switched on when the master brake cylinder is not actuated, and a pressure in the vehicle braking system and/or a movement of the power brake pressure generator is/are measured and assessed. A displacement of the piston of the power brake pressure generator, a rotation of its electric motor, or the like may be measured as the movement.

It is assessed whether the pressure and/or the movement has/have a value or curve which is customary or to be expected. If the values deviate from what is customary or to be expected, this allows a defect to be inferred, and the vehicle braking system should be checked and, if necessary, repaired.

If the master brake cylinder is not actuated, the power brake pressure generator displaces or delivers brake fluid through the master brake cylinder into a brake fluid reservoir, with no (noteworthy) brake pressure build-up taking place, and the power brake pressure generator moving unimpaired. If the brake pressure increases or the movement of the power brake pressure generator is decelerated, a defect, for example an inadvertently closed separating valve, is to be suspected, which hydraulically disconnects the master brake cylinder from the vehicle braking system.

If the vehicle braking system includes multiple brake circuits, it is possible to establish in which brake circuit the defect occurs by consecutively hydraulically connecting each brake circuit individually to the power brake pressure generator.

If no pressure build-up occurs in the wheel brakes while the method according to the present invention is carried out, the method according to the present invention may be carried out at any time at a standstill or during driving operation, without being noticed by a vehicle driver. The method may already be carried out prior to starting the drive, for example when unlocking or opening a vehicle door, switching on an ignition, or starting an engine. If a pressure is built up in the at least one wheel brake during the functional test, the method according to the present invention is preferably carried out at a standstill of the vehicle. The power brake pressure generator, for example, does not build up any pressure when the master brake cylinder is not actuated, and the power brake pressure generator displaces or delivers brake fluid through the master brake cylinder into a brake fluid reservoir. It is also possible to close intake valves of the wheel brakes for carrying out the method according to the present invention, so that no pressure is built up in the wheel brakes and, as a result, they cannot be actuated.

Refinements and advantageous embodiments of the present invention are described herein.

All features described herein and shown in the FIGURE may be implemented in specific embodiments of the present invention either alone or in a generally arbitrary combination. Embodiments of the present invention which do not include all, but only one or multiple features are generally possible.

The present invention is described in greater detail hereafter based on one specific embodiment shown in the FIGURE.

BRIEF DESCRIPTION OF THE DRAWING

The FIGURE shows a hydraulic diagram of a power vehicle braking system including two brake circuits for explaining the method according to the present invention.

DETAILED DESCRIPTION OF EXAMPLE EMBODIMENTS

The FIGURE shows a hydraulic power vehicle braking system including a slip regulation and two brake circuits I, II, each including two hydraulic wheel brakes 1. The vehicle braking system includes a dual-circuit master brake cylinder 3, which is actuatable by a brake pedal 2, and a power brake pressure generator 5. The two brake circuits I, II, are connected via a respective separating valve 6 to master brake cylinder 3. A pressure sensor 7 is connected to master brake cylinder 3 in one of the two brake circuits II. Master brake cylinder 3 moreover includes a pedal travel sensor 8, with which a movement of brake pedal 2 or a displacement travel of a piston rod or of a piston of master brake cylinder 3 is measurable.

A piston-cylinder unit including a spring-loaded piston 10 is connected as a pedal travel simulator 11 to one of the two brake circuits I of master brake cylinder 3 via a simulator valve 9.

Master brake cylinder 3 includes a depressurized brake fluid reservoir 12 including three chambers, the two brake circuits of master brake cylinder 3 being connected to two of the three chambers of brake fluid reservoir 12. In brake circuit I, at which pedal travel simulator 11 is connected to master brake cylinder 3, a reservoir valve 13, to which a check valve 14, through which a flow is possible in the direction of master brake cylinder 13, is hydraulically connected in parallel, is situated between brake fluid reservoir 12 and master brake cylinder 3.

Power brake pressure generator 5 includes a piston-cylinder unit 15 whose piston 16 is displaceable in a cylinder 19 of piston-cylinder unit 15 with the aid of an electric motor 17 via a threaded drive 18. Electric motor 17 of power brake pressure generator 5 includes a current sensor 20 for measuring an electrical current consumption of electric motor 17, and a rotation angle sensor 21 for measuring a rotation angle of electric motor 17. A pressure sensor 22 is connected to cylinder 19 of piston-cylinder unit 15 of power brake pressure generator 5.

Cylinder 19 of piston-cylinder unit 15 of power brake pressure generator 5 is connected by a check valve 23, through which a flow is possible in the direction of cylinder 19, to one of the three chambers of brake fluid reservoir 12 of master brake cylinder 12, and in particular to the chamber to which master brake cylinder 3 is not connected. In addition, cylinder 19 of piston-cylinder unit 15 of power brake pressure generator 5 is directly connected by a brake line 24 to brake fluid reservoir 12, without interconnecting a valve. Piston 16 of power brake pressure generator 5 traverses an opening of this brake line 24 into cylinder 19 of piston-cylinder unit 15 at the beginning of its displacement, so that piston-cylinder unit 15 of power brake pressure generator 5, during an actuation of power brake pressure generator 5, is hydraulically disconnected from brake fluid reservoir 12.

Cylinder 19 of piston-cylinder unit 15 of power brake pressure generator 5, and thus power brake pressure generator 5, is connected to the two brake circuits I, II of the vehicle braking system via a respective power valve 25. Brake circuits I, II of the vehicle braking system are hydraulically connected in parallel to master brake cylinder 3 and to power brake pressure generator 5, so that the vehicle braking system is selectively actuatable with the aid of master brake cylinder 3 and/or power brake pressure generator 5.

A service braking takes place as a power brake application with the aid of power brake pressure generator 5. For this purpose, a brake pressure is generated with the aid of power brake pressure generator 5, and power valves 25 are opened, so that power brake pressure generator 5 is hydraulically connected to the vehicle braking system. Master brake cylinder 3 is hydraulically disconnected from the vehicle braking system by closing separating valves 6. It serves as a setpoint generator for a brake pressure to be set with the aid of power brake pressure generator 5 and intake valves 26 and discharge valves 27 of wheel brakes 1. The brake pressure to be set is dependent on a hydraulic pressure in master brake cylinder 3 and/or a piston travel of master brake cylinder 3, which are measured with the aid of pressure sensor 7 and pedal travel sensor 8. Simulator valve 9 is opened during the service braking, so that master brake cylinder 3 is able to displace brake fluid into pedal travel simulator 11, and a piston travel and a pedal travel are possible at master brake cylinder 3.

In the event of a malfunction or a failure of power brake pressure generator 5, an auxiliary brake application is possible by actuating master brake cylinder 3, separating valves 6 remaining open, and power valves 25 remaining closed.

An intake valve 26 and a discharge valve 27 are assigned to each wheel brake 1. Via intake valves 26, wheel brakes 1 between separating valve 6 and power valve 25 are connected to one of the two brake circuits I, II. Wheel brakes 1 are connected to brake fluid reservoir 12 via discharge valves 27, and in particular in the illustrated and described specific embodiment of the present invention to the chamber to which power brake pressure generator 5 is connected, and to which master brake cylinder 3 is not connected. Each brake circuit I, II and/or each wheel brake 1 may include a pressure sensor. In the illustrated and described specific embodiment of the present invention, only pressure sensors 7, 22 of master brake cylinder 3 and of power brake pressure generator 5 are present.

Intake valves 26 and discharge valves 27 form wheel brake pressure control valve systems, with the aid of which a brake pressure control of the vehicle braking system and a wheel-specific brake pressure control in each wheel brake 1 individually are possible. In this way, a slip regulation is possible. Such slip regulations are an anti-lock protection, a traction control system and a vehicle dynamics control system or an electronic stability program, the latter colloquially also being referred to as anti-slip control system. The abbreviations ABS, TCS, and VDC or ESP are common for these slip regulations. Such slip regulations are known and are not discussed in greater detail here.

In the illustrated and described specific embodiment of the present invention, separating valves 6, simulator valve 9, reservoir valve 13, power valves 25, intake valves 26, and discharge valves 27 are 2/2-way solenoid valves, separating valves 6, reservoir valve 13 and intake valves 26 being open in their de-energized basic positions, and simulator valve 9, power valves 25, and discharge valves 27 being closed in their de-energized basic positions. For enhanced controllability of the wheel brake pressures in wheel brakes 1, intake valves 26 are proportional valves. The present invention does not preclude other embodiments. Proportional valves mean that intake valves 26 not only have an open and a closed position, but that, in addition to the open and closed positions, any intermediate position between the open and closed positions is possible. The other valves 6, 9, 13, 25, 27 are switching valves, which only have one open position and one closed position, without intermediate positions.

For a test of the functional capability of separating valves 6 according to the present invention, these remain open, and one of the two power valves 25 is opened, and the other power valve 25 remains closed. Intake valves 26 may remain open or be closed. With the aid of electric motor 17, piston 16 is displaced in cylinder 19 of piston-cylinder unit 15 of power brake pressure generator 5 via threaded drive 18, and brake fluid is thus displaced from cylinder 19. The displacement of piston 16 in cylinder 19 of piston-cylinder unit 15 with the aid of electric motor 17 may in general also be interpreted as switching on or actuating power brake pressure generator 5. The brake fluid displaced from cylinder 19 flows through open power valve 25 into the assigned brake circuit I, II, and through the open separating valve 6 of this brake circuit I, II, through the non-actuated master brake cylinder 3 into brake fluid reservoir 12. In one of the two brake circuits I, the brake fluid flows from master brake cylinder 3 through open reservoir valve 13 into brake fluid reservoir 12. As a result of the depressurized brake fluid reservoir 12, no brake pressure is generated, or as a result of a flow resistance, an, at the most, negligible brake pressure is generated, which is measured with the aid of pressure sensor 7 connected to master brake cylinder 3 and/or pressure sensor 22 connected to cylinder 19 of power brake pressure generator 5. Electric motor 17, threaded drive 18 and piston 16 move unbraked, which is measured with the aid of rotation angle sensor 21. Moreover, the current consumption of electric motor 17 may be measured with the aid of current sensor 20. Since no pressure is being built up, electric motor 17 rotates almost without resistance, and its current consumption is low. If a brake pressure builds up, the current consumption of electric motor 17 increases, and/or if electric motor 17 rotates too slowly, becomes slower after initially rotating quickly or even stops, separating valve 6 is closed or, in any case, is not completely open. The defect may also be caused by power valve 25 or reservoir valve 13. In any case, a so-called "hidden defect" is present, which does not necessarily impair the functional capability of the vehicle braking system during a power brake application, and thus remains unnoticed. For example, a closed separating valve 6 would have a severe impact during an auxiliary brake application with the aid of master brake cylinder 3 in the event of a failure of power brake pressure generator 5.

The displacement of piston 16 and the rotation of electric motor 17 and of threaded drive 18 may in general also be interpreted as a movement of power brake pressure generator 5.

The test is repeated for the other brake circuit II, I in that the initially open power valve 25 is closed, and the initially closed power valve 25 is opened.

The test of the functional capability of separating valves 6 may be carried out at any time at a standstill or while driving since wheel brakes 1, due to the absent pressure build-up, are not actuated, unless one or both separating valve(s) 6 is/are closed due to a defect. The prerequisite for the test is that master brake cylinder 3 is not actuated.

During the displacement of piston 16 in cylinder 19 of piston-cylinder unit 15 of power brake pressure generator 5, separating valve 6 in brake circuit I, II may additionally be closed, whose power valve 25 is opened and which is thus hydraulically connected to cylinder 19 of power brake pressure generator 5. Separating valve 6 of the other brake circuit II, I may remain open or also be closed. Since it is now no longer possible for brake fluid to be displaced from the cylinder 19 of power brake pressure generator 5 through master brake cylinder 3 into brake fluid reservoir 12, a hydraulic pressure is built up in cylinder 19, and piston 16 and electric motor 17 are decelerated to a standstill. The pressure build-up is measurable with the aid of pressure sensor 22 of power brake pressure generator 5, and the movement or deceleration of electric motor 17 of power brake pressure generator 5 is measurable with the aid of rotation angle sensor 21. Moreover, the current consumption of electric motor 10 rises, which is measurable with the aid of current sensor 20. If no pressure build-up takes place and electric motor 17 is not decelerated, separating valve 6 does not close. This may also be a so-called "hidden defect" since, during a power brake application, the brake pressure generated by power brake pressure generator 5 also acts in master brake cylinder 3 with an open separating valve 6, which is why the defect may possibly not be noticed. The defect would have an impact if a power brake application were to take place without actuation of master brake cylinder 3, since power brake pressure generator 5 is not able to build up any brake pressure when a separating valve 6 is open and master brake cylinder 3 is not actuated. In this case, power brake pressure generator 5 displaces brake fluid through master brake cylinder 3 into brake fluid reservoir 12.

This test is also carried out by consecutively switching over separating valves 6 and power valves 25 in both brake circuits I, II. If the test is to be carried out while driving, intake valves 26 are closed, and wheel brakes 1 are thus hydraulically disconnected from the vehicle braking system. If the test is carried out while a vehicle is at a standstill, intake valves 26 may remain open or be closed.

For testing the functional capability of simulator valve 9 and reservoir valve 13, power valve 25 of brake circuit I, to which pedal travel simulator 11 is connected and/or in which reservoir valve 13 is situated, is opened, and simulator valve 9 and reservoir valve 13 are closed. The other power valve 25 remains closed. If the test is carried out while driving, intake valves 26 of brake circuit I, to which pedal travel simulator 11 is connected, are closed. At a standstill, intake valves 26 may remain open or be closed. Since it is now not possible to displace brake fluid from cylinder 19 of power brake pressure generator 5, power brake pressure generator 5 generates a pressure, and its piston 16 and electric motor 17 are almost motionless when power brake pressure generator 5 is switched on. If no pressure is built up and/or electric motor 17 rotates and/or electric motor 17 has a low current consumption, simulator valve 9 or reservoir valve 13 is open. Due to pedal travel simulator 11, which absorbs a limited amount of brake fluid with rising pressure, piston 16 and electric motor 17 of power brake pressure generator 5 move a certain distance and are decelerated, and the pressure build-up with the aid of power brake pressure generator 5 takes a little while when simulator valve 9 is open. If separating valve 13 is open, power brake pressure generator 5 displaces brake fluid into brake fluid reservoir 12, and no brake pressure is built up, and piston 16 and electric motor 17 of power brake pressure generator are not decelerated. These two valves 9, 13 may also alternately be opened for establishing whether simulator valve 9 or reservoir valve 13 is not closed.

For the test as to whether power brake pressure generator 5 suctions in brake fluid from brake fluid reservoir 12 during a return stroke, power brake pressure generator 5 is switched on, and at least one of power valves 25 is opened, so that it displaces brake fluid through the open separating valves 6 and the non-actuated master brake cylinder 3 into brake fluid reservoir 12. Thereafter, both power valves 25 are closed, and power brake pressure generator 5 is moved back, i.e., piston 16 is displaced in cylinder 19 within the context of a volume increase and an intake. Due to the closed power valves 25, power brake pressure generator 5, during the return movement, takes in brake fluid from brake fluid reservoir 12 through check valve 23. If, for example, check valve 23 does not open, this may manifest itself in a pressure decrease in cylinder 19 of power brake pressure generator 5 and in a deceleration or a stoppage of piston 16 and of electric motor 17 of the power brake pressure generator. The suctioning of brake fluid from brake fluid reservoir 12 is necessary to compensate for brake pad wear or during an extended slip regulation during which piston 16 is displaced back and forth several times in cylinder 19 of power brake pressure generator 5, and to replace brake fluid which it displaces into wheel brakes 1 and which flows through discharge valves 27 into brake fluid reservoir 12 during the slip regulation.

The test according to the present invention of the functional capability of the vehicle braking system is preferably only carried out in the case of driving, engine and/or surroundings noise which is so loud that the actuation of power brake pressure generator 5 is not noticed.

What is claimed is:

1. A method for testing the functional capability of a hydraulic vehicle braking system, the vehicle braking system including a master brake cylinder and a power brake pressure generator, to which jointly at least one hydraulic wheel brake is connected, and a separating valve that is in a line of a brake and is assigned to the master brake cylinder using which the master brake cylinder is hydraulically disconnectable from the power brake pressure generator and the at least one wheel brake, the method comprising the following steps:
  switching the power brake pressure generator on when the master brake cylinder is not actuated; and
  after the switching on, measuring and assessing a pressure in the vehicle braking system and/or a movement of the power brake pressure generator;
  wherein the method includes at least one of the following features:
  (a) testing whether the separating valve is malfunctioning to be in a closed position by executing an algorithm that is configured to cause performance of the following in a testing period:
    (i) performing a control to place the separating valve in an open position during an open-valve-position period;
    (ii) during the open-valve-position period, performing the switching of the power brake pressure generator to displace brake fluid onto the line of the brake circuit; and
    (iii) identifying that the separating valve is malfunctioning to be in the closed position based on, while the displacement is occurring, a detection of a rotation of the motor being below a predefined rotation rate or slowing;
  (b) testing whether the separating valve is malfunctioning to be in the open position by executing an algorithm that is configured to cause performance of the following in the testing period:
    (i) performing a control to place the separating valve in the closed position during a closed-valve-position period;
    (ii) during the closed-valve-position period, performing the switching of the power brake pressure generator to displace brake fluid onto the line of the brake circuit; and
    (iii) identifying that the separating valve is malfunctioning to be in the open position based on, while the displacement is occurring, a detection of a lack of a slowing of a rotation of the motor;
  (c) testing whether a simulator valve, by which a pedal travel simulator is connected to the master brake cylinder, is malfunctioning by executing an algorithm that is configured to cause performance of the following in the testing period:
    (i) performing a control to place the simulator valve in a closed position during a closed-simulator-valve-position period;
    (ii) during the closed-simulator-valve-position period, performing the switching of the power brake pressure generator to displace brake fluid onto the line of the brake circuit; and
    (iii) identifying that the simulator valve is malfunctioning based on, while the displacement is occurring, at least one of:
      a detection of a delay of a deceleration of at least one of a piston and the motor of the power brake pressure generator; and
      a detection of a pressure build up on the brake circuit occurring with a delay;
  (d) testing whether a reservoir valve between a brake fluid reservoir and the brake circuit is malfunctioning by executing an algorithm that is configured to cause performance of the following in the testing period:
    (i) performing a control to place the reservoir valve in a closed position during a closed-reservoir-valve-position period;
    (ii) during the closed-reservoir-valve-position period, performing the switching of the power brake pressure generator to displace brake fluid onto the line of the brake circuit; and
    (iii) identifying that the reservoir valve is malfunctioning based on, while the displacement is occurring, a detection of a lack of the deceleration of the at least one of the piston and the motor of the power brake pressure generator; and
  (e) testing a suctioning function of the power brake pressure generator by executing an algorithm that is configured to cause performance of the following in the testing period:
    (i) performing the switching of the power brake pressure generator to displace brake fluid onto the line of the brake circuit by shifting the piston in a pressure-generating direction during a fluid displacement period;
    (ii) upon conclusion of the fluid displacement period, closing a power valve thereby disconnecting the power brake pressure generator from the line of the brake circuit;
    (iii) while the power valve is in a closed state due to the closing of the power valve, performing a control to shift the piston opposite to the pressure-generating direction; and (iv) identifying the suctioning function is malfunctioning based on at least one of:
  a detection of a decrease of pressure in a cylinder in which the piston is shifted;
  a detection of a deceleration of a movement of the piston;
  a detection of a deceleration of the motor.

2. The method as recited in claim 1, wherein the master brake cylinder is hydraulically disconnected from the power brake pressure generator during the movement of the power brake pressure generator whenever the separating valve is closed.

3. The method as recited in claim 1, wherein the at least one wheel brake is assigned an intake valve using which the wheel brake is hydraulically disconnectable from the master brake cylinder and the power brake pressure generator, wherein the vehicle braking system includes the brake fluid reservoir which is connected to the master brake cylinder via the reservoir valve, and the pedal travel simulator which is connected to the master brake cylinder via the simulator valve, and wherein the testing includes the control to place the reservoir valve in the closed position and the control to place the simulator valve in the closed position, the switching on of the power brake pressure generator, and a measure of the pressure in the vehicle braking system and/or the movement of the power brake pressure generator.

4. The method as recited in claim 1, wherein the vehicle braking system includes the power valve using which the power brake pressure generator is hydraulically disconnectable from the master brake cylinder and the at least one hydraulic wheel brake, wherein the power brake pressure generator is connected to the brake fluid reservoir by a check valve through which a flow is possible towards the power brake pressure generator, brake fluid is delivered using the power brake pressure generator when the power valve is open, and subsequently brake fluid is taken in by closing the power valve, and thereafter is delivered again, with the power valve remaining closed, and the pressure in the vehicle braking system and/or the movement of the power brake pressure generator is measured and assessed.

5. The method as recited in claim 1, wherein the power brake pressure generator includes a piston-cylinder unit including a drive by external power for pressure generation.

6. The method as recited in claim 1, wherein the method is carried out only in the event of noise, in the case of which, noise generated by the vehicle braking system as a result of the method is not noticeable.

7. The method as recited in claim 1, wherein the method further includes testing whether the separating valve is malfunctioning to be in the closed position by executing an algorithm that is configured to cause performance of the following in the testing period:
  (i) performing the control to place the separating valve in the open position during the open-valve-position period;
  (ii) during the open-valve-position period, performing the switching of the power brake pressure generator to displace brake fluid onto the line of the brake circuit; and
  (iii) identifying that the separating valve is malfunctioning to be in the closed position based on, while the displacement is occurring, a detection of a pressure increase in the brake circuit in which the separating valve is located.

8. The method as recited in claim 1, wherein the method includes the testing of whether the separating valve is malfunctioning to be in the closed position by executing the algorithm that is configured to cause performance of the following in the testing period:
  (i) performing the control to place the separating valve in the open position during the open-valve-position period;
  (ii) during the open-valve-position period, performing the switching of the power brake pressure generator to displace brake fluid onto the line of the brake circuit; and
  (iii) identifying that the separating valve is malfunctioning to be in the closed position based on, while the displacement is occurring, the detection of the rotation of the motor being below the predefined rotation rate or slowing.

9. The method as recited in claim 1, wherein the method includes the testing of whether the separating valve is malfunctioning to be in the open position by executing an algorithm that is configured to cause performance of the following in the testing period:
  (i) performing the control to place the separating valve in the closed position during the closed-valve-position period;
  (ii) during the closed-valve-position period, performing the switching of the power brake pressure generator to displace brake fluid onto the line of the brake circuit; and
  (iii) identifying that the separating valve is malfunctioning to be in the open position based on, while the displacement is occurring, the detection of the lack of the slowing of the rotation of the motor.

10. The method as recited in claim 1, wherein the method includes the testing of whether the simulator valve, by which the pedal travel simulator is connected to the master brake cylinder, is malfunctioning by executing the algorithm that is configured to cause performance of the following in the testing period:
  (i) performing the control to place the simulator valve in the closed position during the closed-simulator-valve-position period;
  (ii) during the closed-simulator-valve-position period, performing the switching of the power brake pressure generator to displace brake fluid onto the line of the brake circuit; and
  (iii) identifying that the simulator valve is malfunctioning based on, while the displacement is occurring, the detection of the delay of the deceleration of the at least one of the piston and the motor of the power brake pressure generator.

11. The method as recited in claim 10, wherein the algorithm is further configured to cause performance of a control to place a reservoir valve, which is between a brake fluid reservoir and the brake circuit, in a closed position during the closed-simulator-valve-position period.

12. The method as recited in claim 1, wherein the method includes the testing of whether the simulator valve, by which the pedal travel simulator is connected to the master brake cylinder, is malfunctioning by executing the algorithm that is configured to cause performance of the following in the testing period:
  (i) performing the control to place the simulator valve in the closed position during the closed-simulator-valve-position period;
  (ii) during the closed-simulator-valve-position period, performing the switching of the power brake pressure generator to displace brake fluid onto the line of the brake circuit; and (iii) identifying that the simulator valve is malfunctioning based on, while the displacement is occurring, the detection of the pressure build up on the brake circuit occurring with a delay.

13. The method as recited in claim 12, wherein the algorithm is further configured to cause performance of a control to place a reservoir valve, which is between a brake fluid reservoir and the brake circuit, in a closed position during the closed-simulator-valve-position period.

14. The method as recited in claim 1, wherein the method includes the testing of whether the reservoir valve between the brake fluid reservoir and the brake circuit is malfunctioning by executing the algorithm that is configured to cause performance of the following in the testing period:
(i) performing the control to place the reservoir valve in the closed position during the closed-reservoir-valve-position period;
(ii) during the closed-reservoir-valve-position period, performing the switching of the power brake pressure generator to displace brake fluid onto the line of the brake circuit; and
(iii) identifying that the reservoir valve is malfunctioning based on, while the displacement is occurring, the detection of the lack of the deceleration of the at least one of the piston and the motor of the power brake pressure generator.

15. The method as recited in claim 14, wherein the algorithm is further configured to cause performance of a control to place a simulator valve, by which a pedal travel simulator is connected to the master brake cylinder, in a closed position during the closed-reservoir-valve-position period.

16. The method as recited in claim 1, wherein the method includes the testing of the suctioning function of the power brake pressure generator by executing the algorithm that is configured to cause performance of the following in the testing period:
(i) performing the switching of the power brake pressure generator to displace brake fluid onto the line of the brake circuit by shifting the piston in the pressure-generating direction during the fluid displacement period;
(ii) upon conclusion of the fluid displacement period, closing the power valve thereby disconnecting the power brake pressure generator from the line of the brake circuit;
(iii) while the power valve is in the closed state due to the closing of the power valve, performing the control to shift the piston opposite to the pressure-generating direction; and
(iv) identifying the suctioning function is malfunctioning based on the detection of the decrease of pressure in the cylinder in which the piston is shifted.

17. The method as recited in claim 1, wherein the method includes the testing of the suctioning function of the power brake pressure generator by executing the algorithm that is configured to cause performance of the following in the testing period:
(i) performing the switching of the power brake pressure generator to displace brake fluid onto the line of the brake circuit by shifting the piston in the pressure-generating direction during the fluid displacement period;
(ii) upon conclusion of the fluid displacement period, closing the power valve thereby disconnecting the power brake pressure generator from the line of the brake circuit;

(iii) while the power valve is in the closed state due to the closing of the power valve, performing the control to shift the piston opposite to the pressure-generating direction; and
(iv) identifying the suctioning function is malfunctioning based on the detection of the deceleration of the movement of the piston.

18. The method as recited in claim 1, wherein the method includes the testing of the suctioning function of the power brake pressure generator by executing the algorithm that is configured to cause performance of the following in the testing period:
(i) performing the switching of the power brake pressure generator to displace brake fluid onto the line of the brake circuit by shifting the piston in the pressure-generating direction during the fluid displacement period;
(ii) upon conclusion of the fluid displacement period, closing the power valve thereby disconnecting the power brake pressure generator from the line of the brake circuit;
(iii) while the power valve is in the closed state due to the closing of the power valve, performing the control to shift the piston opposite to the pressure-generating direction; and
(iv) identifying the suctioning function is malfunctioning based on the detection of the deceleration of the motor.

19. The method as recited in claim 1, wherein the vehicle braking system includes multiple brake circuits which are each connected to the power brake pressure generator via a respective power valve, and the testing is carried out consecutively for each of the multiple brake circuits, one at a time, by opening respective ones of the power valves for the respective switching of the respective testing performed for the respective ones of the brake circuits.

20. A method for testing the functional capability of a hydraulic vehicle braking system, the vehicle braking system including a master brake cylinder and a power brake pressure generator, to which jointly at least one hydraulic wheel brake is connected, and a separating valve that is in a line of a brake and is assigned to the master brake cylinder using which the master brake cylinder is hydraulically disconnectable from the power brake pressure generator and the at least one wheel brake, the method comprising the following steps:
switching the power brake pressure generator on when the master brake cylinder is not actuated; and
after the switching on, measuring and assessing a pressure in the vehicle braking system and/or a movement of the power brake pressure generator;
wherein:
the method includes at least one of the following features:
(a) testing whether the separating valve is malfunctioning to be in a closed position by executing an algorithm that is configured to cause performance of the following in a testing period:
(i) performing a control to place the separating valve in an open position during an open-valve-position period;
(ii) during the open-valve-position period, performing the switching of the power brake pressure generator to displace brake fluid onto the line of the brake circuit; and
(iii) identifying that the separating valve is malfunctioning to be in the closed position based on, while the displacement is occurring, a detection of an increase in current consumption by a motor of the power brake pressure generator;

(b) testing whether the separating valve is malfunctioning to be in the open position by executing an algorithm that is configured to cause performance of the following in the testing period:
  (i) performing a control to place the separating valve in the closed position during a closed-valve-position period;
  (ii) during the closed-valve-position period, performing the switching of the power brake pressure generator to displace brake fluid onto the line of the brake circuit; and
  (iii) identifying that the separating valve is malfunctioning to be in the open position based on, while the displacement is occurring, a detection of a lack of a pressure increase in the brake circuit in which the separating valve is located;

(d) testing whether a reservoir valve between a brake fluid reservoir and the brake circuit is malfunctioning by executing an algorithm that is configured to cause performance of the following in the testing period:
  (i) performing a control to place the reservoir valve in a closed position during a closed-reservoir-valve-position period;
  (ii) during the closed-reservoir-valve-position period, performing the switching of the power brake pressure generator to displace brake fluid onto the line of the brake circuit; and
  (iii) identifying that the reservoir valve is malfunctioning based on, while the displacement is occurring, a detection of a lack of the pressure build up on the brake circuit, the algorithm being further configured to cause performance of a control to place a simulator valve, by which a pedal travel simulator is connected to the master brake cylinder, in a closed position during the closed-reservoir-valve-position period; and the vehicle braking system includes multiple brake circuits which are each connected to the power brake pressure generator via a respective power valve, and the testing is carried out consecutively for each of the multiple brake circuits, one at a time, by opening respective ones of the power valves for the respective switching of the respective testing performed for the respective ones of the brake circuits.

21. The method as recited in claim 20, wherein the method includes the testing of whether the separating valve is malfunctioning to be in the closed position by executing the algorithm that is configured to cause performance of the following in the testing period:
  (i) performing the control to place the separating valve in the open position during the open-valve-position period;
  (ii) during the open-valve-position period, performing the switching of the power brake pressure generator to displace brake fluid onto the line of the brake circuit; and
  (iii) identifying that the separating valve is malfunctioning to be in the closed position based on, while the displacement is occurring, the detection of the increase in the current consumption by the motor of the power brake pressure generator.

22. The method as recited in claim 20, wherein the method includes the testing of whether the separating valve is malfunctioning to be in the open position by executing an algorithm that is configured to cause performance of the following in the testing period:
  (i) performing the control to place the separating valve in the closed position during the closed-valve-position period;
  (ii) during the closed-valve-position period, performing the switching of the power brake pressure generator to displace brake fluid onto the line of the brake circuit; and
  (iii) identifying that the separating valve is malfunctioning to be in the open position based on, while the displacement is occurring, the detection of the lack of the pressure increase in the brake circuit in which the separating valve is located.

23. The method as recited in claim 20, wherein the method includes the testing of whether the reservoir valve between the brake fluid reservoir and the brake circuit is malfunctioning by executing the algorithm that is configured to cause performance of the following in the testing period:
  (i) performing the control to place the reservoir valve in the closed position during the closed-reservoir-valve-position period;
  (ii) during the closed-reservoir-valve-position period, performing the switching of the power brake pressure generator to displace brake fluid onto the line of the brake circuit; and
  (iii) identifying that the reservoir valve is malfunctioning based on, while the displacement is occurring, the detection of the lack of the pressure build up on the brake circuit.

24. The method as recited in claim 23, wherein the algorithm is further configured to cause performance of a control to place a simulator valve, by which a pedal travel simulator is connected to the master brake cylinder, in a closed position during the closed-reservoir-valve-position period.

25. A method for testing the functional capability of a hydraulic vehicle braking system, the vehicle braking system including a master brake cylinder and a power brake pressure generator, to which jointly at least one hydraulic wheel brake is connected, and a separating valve assigned to the master brake cylinder using which the master brake cylinder is hydraulically disconnectable from the power brake pressure generator and the at least one wheel brake, the method comprising the following steps:
  switching the power brake pressure generator on when the master brake cylinder is not actuated;
  after the switching on, measuring and assessing a movement of the power brake pressure generator; and
  based on at least one result of the measuring and assessing, determining:
    an operability of an intake via which to obtain input of a replenishment amount of a fluid into the power pressure generator; and
    whether a particular fluid connection is fully open.

* * * * *